United States Patent
Soh

(10) Patent No.: US 9,166,507 B2
(45) Date of Patent: Oct. 20, 2015

(54) SENSING A BACK ELECTROMOTIVE FORCE OF A MOTOR

(71) Applicant: Silicon Laboratories Inc., Austin, TX (US)

(72) Inventor: Kok Hong Soh, Serangoon North (SG)

(73) Assignee: SILICON LABORATORIES INC., Austin, TX (US)

( * ) Notice: Subject to any disclaimer, the term of this patent is extended or adjusted under 35 U.S.C. 154(b) by 14 days.

(21) Appl. No.: 14/140,997

(22) Filed: Dec. 26, 2013

(65) Prior Publication Data

US 2015/0188465 A1 Jul. 2, 2015

(51) Int. Cl.
*H02P 6/00* (2006.01)
*H02P 6/18* (2006.01)

(52) U.S. Cl.
CPC ...................... *H02P 6/182* (2013.01)

(58) Field of Classification Search
CPC ................................. H02P 6/182; H02P 6/085
USPC ............ 318/400.35, 400.34, 400.32, 400.01, 318/700
See application file for complete search history.

(56) References Cited

U.S. PATENT DOCUMENTS

| | | | |
|---|---|---|---|
| 5,068,582 A | 11/1991 | Scott | |
| 5,345,156 A * | 9/1994 | Moreira | 318/400.04 |
| 8,314,581 B1 * | 11/2012 | Krishnamoorthy et al. | 318/400.34 |
| 8,476,852 B2 * | 7/2013 | Hawker et al. | 318/400.14 |

FOREIGN PATENT DOCUMENTS

| | | |
|---|---|---|
| DE | 202007013726 | 2/2009 |
| DE | 102011085662 | 10/2012 |
| JP | 2006034060 | 2/2004 |

OTHER PUBLICATIONS

Office Action dated Feb. 2, 2015, filed in corresponding German Patent Application No. 10 2014 019 237.7, with English translation.

* cited by examiner

*Primary Examiner* — David S Luo
(74) *Attorney, Agent, or Firm* — Trop, Pruner & Hu, P.C.

(57) ABSTRACT

An apparatus includes a controller and a comparator. The controller generates pulse width modulation (PWM) signals to drive stator windings of a brushless direct current (BLDC) motor in a commutation sequence such that one of the stator windings at a given time is open; and generates a tracking signal synchronized to the PWM signals and indicative of times when a leakage current is present in the open stator winding. The comparator senses when a back electromotive force of the open stator winding has an associated zero crossing. The sensing by the comparator is selectively enabled and disabled by the tracking signal.

19 Claims, 12 Drawing Sheets

SENSING A BACK ELECTROMOTIVE FORCE OF A MOTOR

BACKGROUND

A direct current (DC) motor is a machine that uses DC power to produce a torque force on a rotating member, or rotor, of the machine. In a typical DC motor, currents are applied to and removed from wire windings of the motor in accordance with a phase, or commutation, sequence; and this interaction of the currents with a magnetic field of the DC motor produces the torque force to rotate the rotor.

The ways in which the currents are commutated to the DC motor's winding vary among different DC motor topologies. One type of DC motor is a brushed DC motor, in which brushes mechanically commutate currents to wire windings of the rotor, and the stator of the brushed DC motor has permanent magnets or electromagnets that produce a stationary magnetic field. In a typical brushless DC motor (BLDC), permanent magnets are mounted to the rotor to produce a magnetic field; and semiconductor devices control the switching of currents with wire windings of the stator according the commutation sequence.

SUMMARY

In an example embodiment, a method includes using a processing core to regulate at least one characteristic of a first signal used to drive a first stator winding of a brushless direct current (BLDC) motor. A peripheral component is used to generate a tracking signal in response to the first signal, the tracking signal indicating times to sense a back electromotive force of a second stator winding of the BLDC motor, and the back electromotive force is sensed in response to the tracking signal.

In another example embodiment, an apparatus includes a controller and a comparator. The controller generates pulse width modulation (PWM) signals to drive stator windings of a brushless direct current (BLDC) motor in a commutation sequence such that one of the stator windings at a given time is open; and generates a tracking signal synchronized to the PWM signals and indicative of times when a leakage current is present in the open stator winding. The comparator senses when a back electromotive force of the open stator winding has an associated zero crossing. The sensing by the comparator is selectively enabled and disabled by the tracking signal.

In another example embodiment, an apparatus includes an integrated circuit that includes an integrated circuit that includes a processing core, a comparator and a timer circuit. The timer circuit is adapted to provide a plurality of first signals to drive a plurality of stator windings of a brushless direct current (BLDC) motor in a commutation sequence such that in a given phase of the commutation sequence, a given stator winding of the plurality of stator windings is open, and the timer circuit is adapted to provide a tracking signal. The comparator is adapted to sense a voltage of the given stator winding during the given phase for a zero crossing of a back electromotive force, wherein a timing of the sensing during the given phase is controlled by the tracking signal.

Advantages and other desired features will become apparent from the following drawings, description and claims.

DETAILED DESCRIPTION

Figure 1:
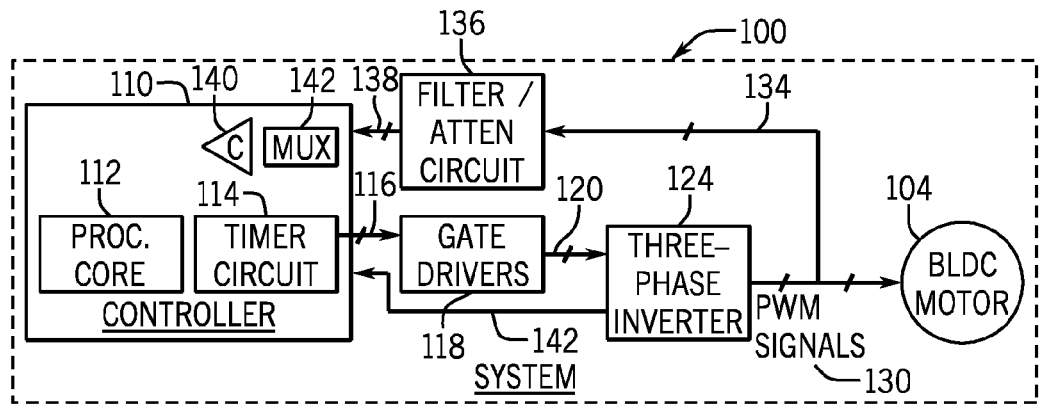
FIG. 1 is a schematic diagram of a motor system according to an example embodiment.

Referring to FIG. 1, in accordance with example embodiments, a system 100 for controlling a brushless direct current (BLDC) motor 104 includes a controller 110 and a three phase inverter 124. In general, the controller 110 generates signals 116 (pulse width modulation (PWM) signals and other signals described herein) that, via gate drivers 118, produce signals 120 to cause the three phase inverter 124 to furnish PWM signals 130 to the BLDC motor 104. The PWM signals 130 have an associated phasing, or commutation sequence, which controls the switching of currents to/from stator windings of the BLDC motor 104.

Based on feedback signals, the controller 110 regulates various aspects of the PWM signals 130 (the duty cycles of the PWM signals 130 and the phasing of the PWM signals 130, as examples) for such purposes as controlling the speed of the BLDC motor 104 and controlling the torque that is applied by the motor 104. In this manner, as depicted in FIG. 1, as part of this control, the controller 110 may receive feedback signals 138 from a filter/attenuation circuit 136. In general, the filter/attenuation circuit 136 may be coupled to the stator windings of the BLDC 104 to receive signals 134 that represent, or indicate, the stator terminal voltages of the BLDC motor 104.

As disclosed herein, the controller 110 uses the feedback signals 138 to monitor the position of the BLDC motor's rotor so that the controller 110 may regulate the commutation of currents to the stator windings of the motor 104 for purposes of causing the motor 104 to operate at or near its maximum torque. For this monitoring, as disclosed herein, the controller 110 observes voltages called back electromotive forces, or "emfs." In general, a back emf is a voltage that is induced on a stator winding of the BLDC motor 104 due to the rotating magnetic field that is produced by the permanent magnets on the motor's rotor.

More specifically, a back emf on a given stator winding is cyclical and rises and falls above and below zero volts in its cycle. Because the position of the rotor is known when the back emf is at zero volts (or makes a "zero crossing"), the controller 110 may regulate the phasing of the PWM signals 130 accordingly to synchronize the commutation of the currents with the rotor movement. For purposes of detecting zero crossings of one or more monitored back emfs, the controller 110 includes at least one comparator 140, which is constructed to detect back emf zero crossings and provide a signal that indicates when such detections occur.

In general, a back emf is present on a stator winding both when a current is applied to the winding and when the current is removed from the winding, as part of the commutation sequence. Therefore, to detect when zero crossing of a back emf for a given stator winding occurs, the controller 110 monitors for the zero crossing when the commutation sequence indicates that the stator winding is "open," or not receiving a current (although this condition may not hold true due to a leakage current, as further described herein).

In this manner, the controller 110 senses back emf zero crossings on "open" stator windings. Moreover, as described herein, the controller 110 further controls the timing of these zero crossing detections to ensure that the detections are not adversely affected by leakage currents.

Figure 2:
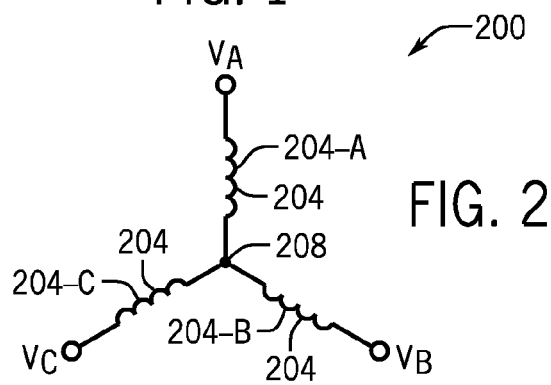
FIG. 2 is a schematic diagram of stator windings of a brushless direct current (BLDC) motor according to an example embodiment.

Referring to FIG. 2, as a more specific example, the BLDC motor 104 may have a stator 200 that has three windings 204 (example windings 204-A, 204-B and 204-C, being depicted in FIG. 2), which are connected in a wye configuration. It is noted that in accordance with further example embodiments, the stator windings 204 may be connected in another configuration, such as a delta configuration. For the wye configuration of FIG. 2, the stator windings 204 have a common terminal connection at a neutral 208 of the stator 200. The other terminal of each stator winding 204 receives the PWM signals 130 according to the commutation sequence.

Referring to FIG. 2 in conjunction with FIG. 1, in accordance with example embodiments, the three phase inverter 124 drives the stator windings 204 with a six step commutation. For any particular step of the commutation, two of the three windings 204 are ideally conducting current, with the remaining winding 204 being the "open" winding and thus, ideally not conducting current. For example, one step of the commutation may involve the three phase inverter 124 applying current (via respective PWM signals 130) to the stator windings 204-A and 204-B; and for this step, the stator winding 204-C is the "open" winding.

For the next step of the commutation, the three phase inverter 124 may apply current to the stator windings 204-A and 204-C. For this step, the stator winding 204-B is the open winding. The next two steps of the commutation may involve applying current to the stator winding 204-B. In this regard, the next step may involve the three phase inverter 124 applying current to the stator winding 204-B and the stator winding 204-C. The next step may involve the three phase inverter 124 applying current to the stator winding 204-B and 204-A. Likewise, the final two steps of the six step commutation involves the three phase inverter 124 applying current to the stator windings 204-C and 204-A, proceeded by the inverter 124 applying current to the stator windings 204-C and 204-B.

As the rotor of the BLDC motor 104 rotates, the permanent magnet(s) on the rotor induce back emfs on the stator windings 204. In this regard, the changing magnetic field produced by the rotation of the permanent magnet(s) relative to the stator windings 204 produces a back emf on each of the windings 204. When the magnetic axis of the permanent magnet(s) is orthogonal with respect to a given stator winding 204, the back emf on that winding 204 is zero volts, i.e., a zero crossing occurs. Because at any step of the six step commutation sequence, two of the stator windings 204 are being driven with current and the other winding 204 is open, the currently open stator winding 204 for this step may be monitored for purposes of detecting a zero crossing. This permits the controller 110 to determine the precise position of the rotor relative to the stator at the time of the detected crossing.

Figure 3A:
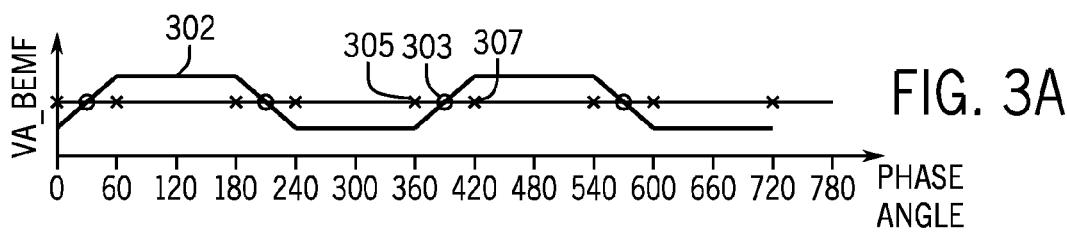
FIGS. 3A, 3B and 3C are schematically depicted back electromotive force waveforms of the BLDC motor according to an example embodiment.
Figure 3B:
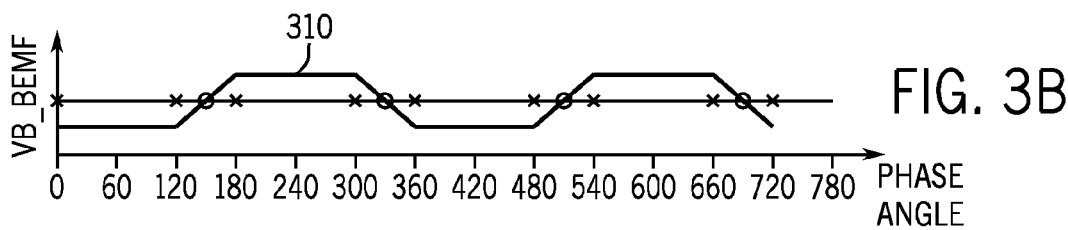
Figure 3C:
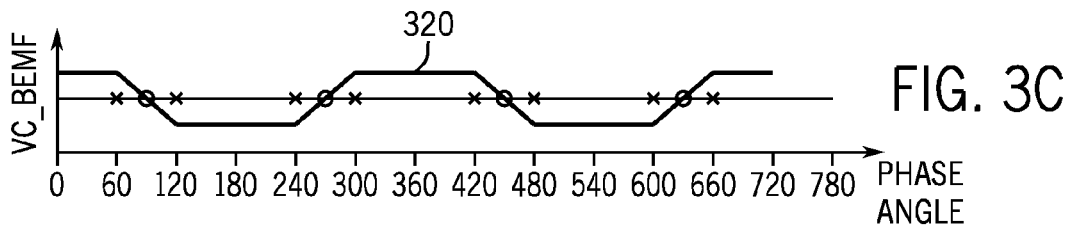

FIGS. 3A, 3D and 3C depict example back emf waveforms 302, 310 and 320 for the stator windings 204-A, 204-B and 204-C, respectively. The waveform 302 for the stator winding 204-A has a depicted zero crossing at reference numeral 303 (see FIG. 3A), for example. At the time of the zero crossing, the stator terminal 204-A is open (i.e., the stator terminal 204-A is open for the phase angle interval between reference numerals 305 to 307 of FIG. 3A).

As described further herein, although ideally the voltage of an open stator winding 204 accurately indicates the back emf, the open stator winding voltage may be adversely affected by a leakage current (under certain conditions described below), which causes a false detection of a back emf zero crossing. More specifically, referring back to FIG. 1, in accordance with example embodiments, the leakage current may be attributable to features of the three phase inverter 124. Systems and techniques are disclosed herein for purposes of controlling when the comparator 140 senses for a zero crossing of a back emf on a given open stator winding so that the comparator 140 does not incorrectly indicate a back emf zero crossing.

Figure 4A:
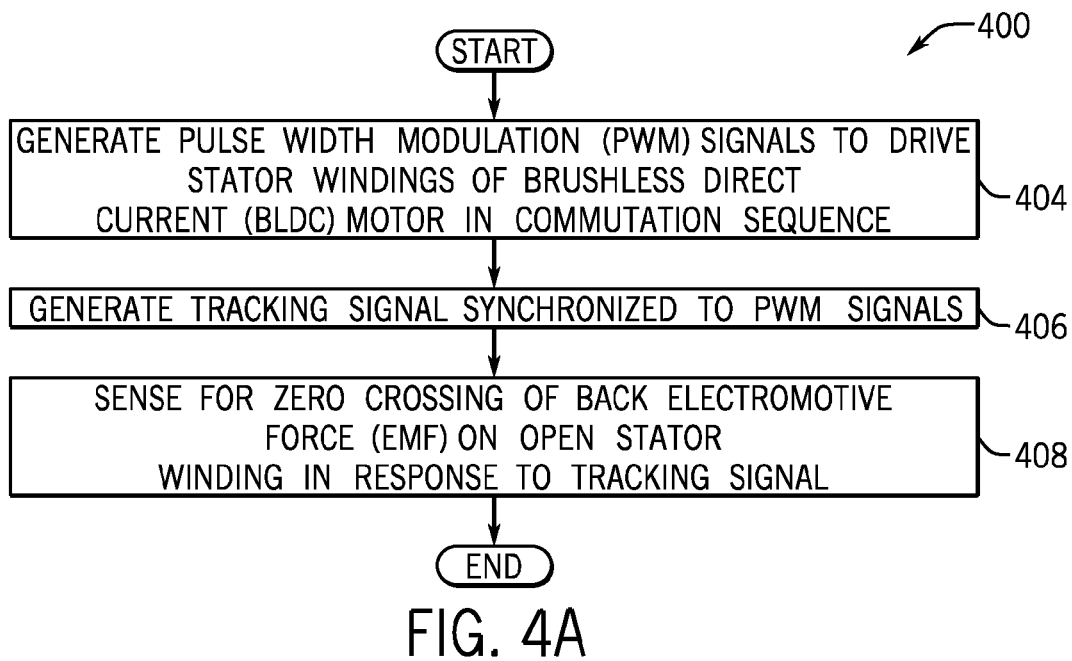
FIG. 4A is a flow diagram depicting a technique to sense a back electromotive force of a BLDC motor according to an example embodiment.

More specifically, referring to FIG. 4A, in accordance with example embodiments, a technique 400 includes generating (block 404) signals (pulse width modulation (PWM) signals, for example) to drive stator windings of a brushless direct current (BLDC) motor in a commutation sequence such that one of the stator windings at a given time is not being driven. The technique 400 further includes generating (block 406) a tracking signal, which is synchronized to the PWM signals for purposes of controlling when sensing of the back emf occurs so that the back emf is not sensed for a zero crossing under conditions in which a leakage current may be present in the open stator winding. A back electromotive force of an open stator winding may then be sensed to detect an associated zero crossing in response to the tracking signal, pursuant to block 408.

Figure 4B:
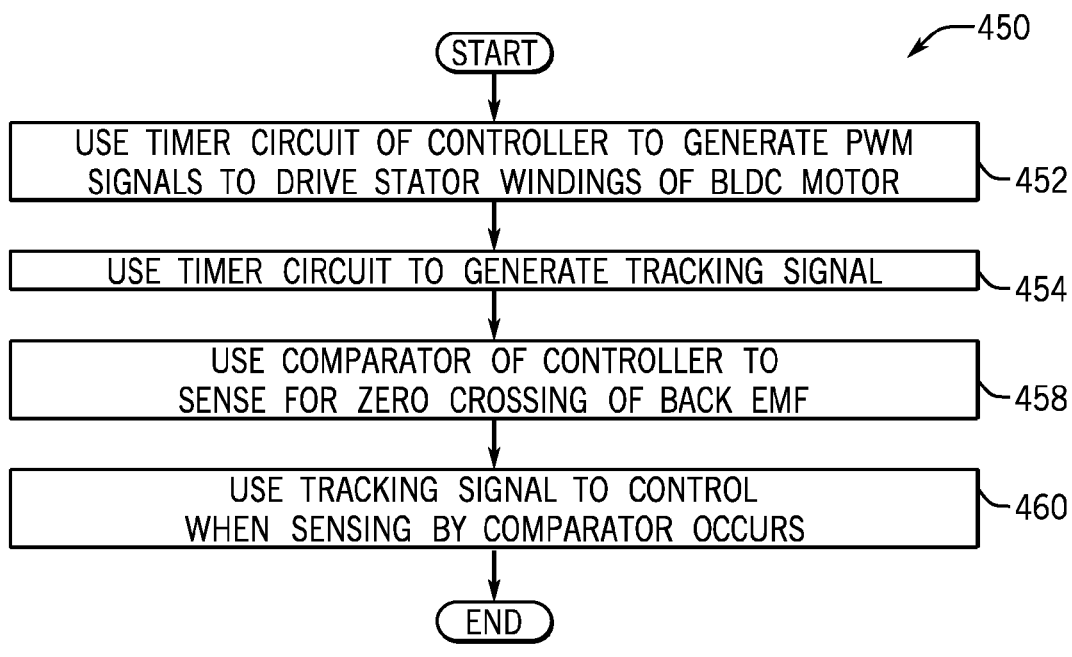
FIG. 4B is a flow diagram depicting a technique to sense a back electromotive force of a BLDC motor according to another example embodiment.

Referring to FIG. 4B, as a more specific example, in accordance some embodiments, the controller 110 performs a technique 450 for purposes of sensing a zero crossing of a back emf. Pursuant to the technique 450, a timer circuit (a programmable counter array (PCA) or one or multiple counters, as examples) of the controller is used (block 452) to provide PWM signals to drive a plurality of stator windings of a BLDC motor in a commutation sequence such that in a given phase of the commutation sequence, a given stator winding is open. The timer circuit is also used (block 454) to generate a tracking signal. A comparator of the controller is used (block 456) to sense a voltage of the given stator winding during the given phase for a zero crossing of a back electromotive force, pursuant to block 458. A timing of the sensing during the given phase is controlled by the tracking signal, pursuant to block 460, such that the tracking signal controls when sensing of the zero crossing by the comparator occurs. As further describes herein, the tracking signal may be used to selectively enable and disable (or selectively "blank") the output of the comparator based on a timing of the PWM signals so that the comparator does not incorrectly indicate a back emf zero crossing due to the presence of a leakage current.

Figure 5:
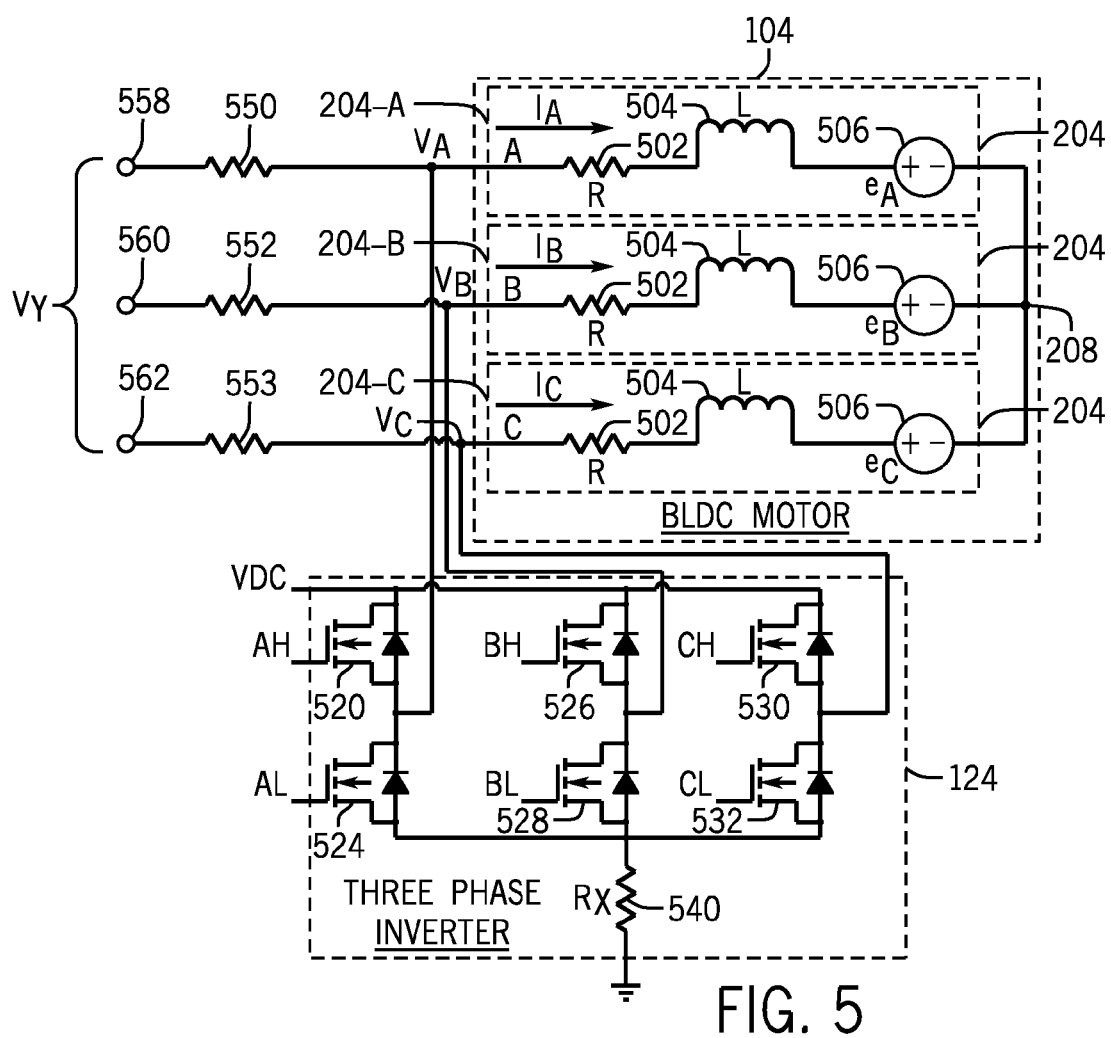
FIG. 5 is a schematic diagram of electrical circuitry of a BLDC motor and a three phase inverter of the motor system of FIG. 1 according to an example embodiment.
Figure 6A:
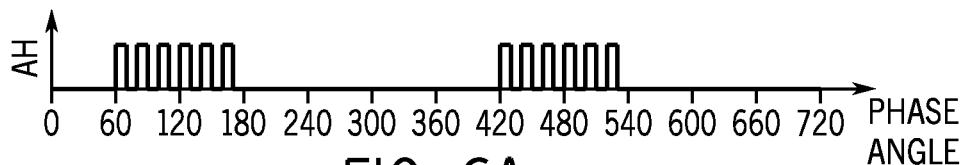
FIGS. 6A, 6B, 6C, 6D 6E and 6F are waveforms illustrating a high side pulse width modulation (PWM) scheme for controlling a BLDC motor according to an example embodiment.
Figure 6B:
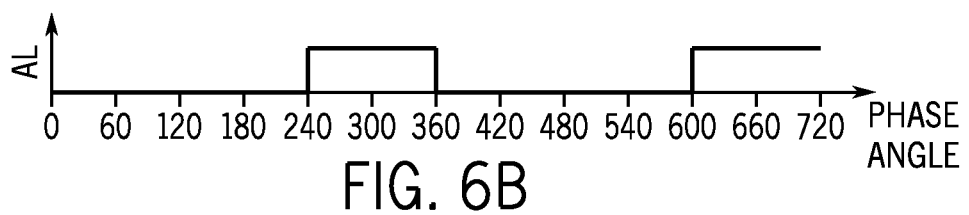
Figure 6C:
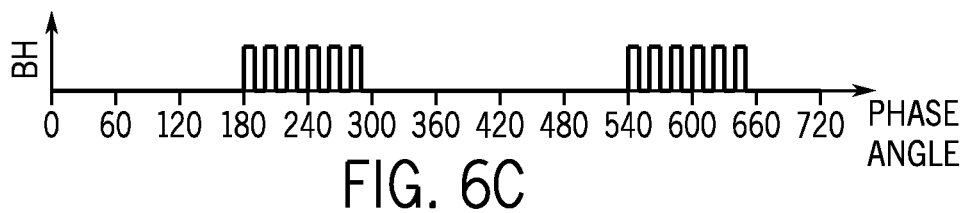
Figure 6D:
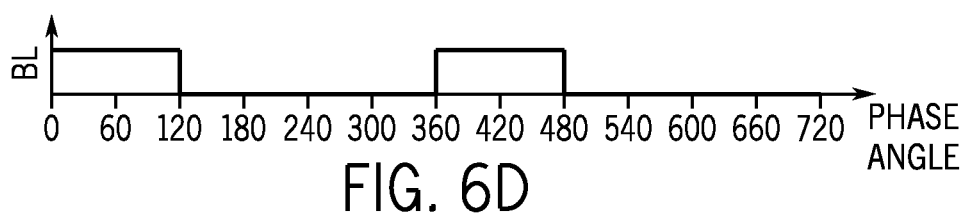
Figure 6E:
Figure 6F:
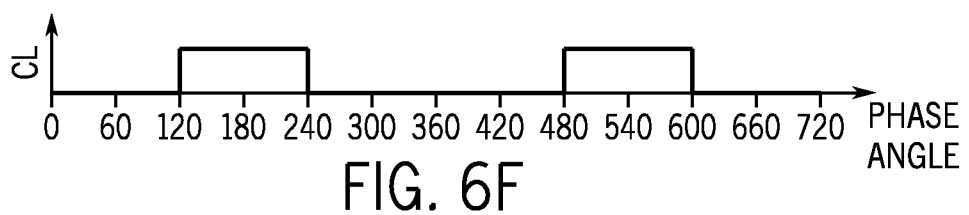

Referring to FIG. 5, in accordance with example embodiments, each of the stator windings 204-A, 204-B and 204-C may be modeled as being formed from a resistor 502, inductor 504 and a back emf source 506, which are serially coupled together. Moreover, as depicted in FIG. 5, the stator windings 204 are commonly connected together at a neutral 208. It is noted that the neutral 208 is not accessible outside of the BLDC motor 104. Therefore, as shown in FIG. 5, resistors 550, 552 and 553 may be coupled to the stator terminals to provide corresponding signals at terminals 558, 560 and 562, which may be combined to provide a virtual neutral voltage (called "$V_y$," herein). As an example, in accordance with some embodiments, the $V_y$ virtual neutral voltage may be an average of the three stator voltages, or $\frac{1}{3} \cdot (V_A + V_B + V_C)$. Thus, in accordance with some embodiments, the controller 100 considers a voltage of a given stator winding 204 to be the potential difference between the stator terminal and the $V_Y$ virtual voltage.

The three phase inverter 124 for this example embodiment contains six "switches," which are formed by transistors, such as metal-oxide-semiconductor field-effect transistors (MOSFETs): high side MOSFETs 520, 526 and 530, which may be used to selectively couple the stator windings 204-A, 204-B and 204-C, respectively, to a positive supply voltage (called "$V_{DC}$" in FIG. 5); and three low side MOSFETs 524, 528 and 532, which may be selectively activated to couple the stator windings 204-A, 204-B and 204-C, respectively, to ground. Moreover, as depicted in FIG. 5, the three phase inverter 124 may include a relatively small resistor 540 between the main current paths of the low side transistors 524, 528 and 532 and ground for purposes of allowing the controller 100 to acquire a stator current measurement.

As depicted in FIG. 5, the high side MOSFETs 520, 526 and 530 receive respective control signals called "AH," "BH" and "CH," respectively, at their gate terminals which control whether the MOSFETs are turned on or off (i.e., whether the MOSFETs conduct current through their channels). The low side MOSFETs 524, 528 and 532 receive control signals called "AL," "BL" and "CL," respectively, at their gate terminals, which control whether the MOSFETs are turned on or off. In general, the phases of the commutation sequence may be described as follows in an example embodiment:

TABLE 1

| COMMUTATION PHASE | MOTOR PHASE ELECTRICAL ANGLE (DEGREES) | GATE DRIVE OUTPUTS | | | | | | OPEN PHASE |
|---|---|---|---|---|---|---|---|---|
| | | HIGH-SIDE | | | LOW-SIDE | | | |
| | | AH | BH | CH | AL | BL | CL | |
| 0 | 0-60 | Off | Off | On | Off | On | Off | A |
| 1 | 60-120 | On | Off | Off | Off | On | Off | C |
| 2 | 120-180 | On | Off | Off | Off | Off | On | B |
| 3 | 180-240 | Off | On | Off | Off | Off | On | A |
| 4 | 240-300 | Off | On | Off | On | Off | Off | C |
| 5 | 300-360 | Off | Off | On | On | Off | Off | B |

Referring to Table 1, the conducting interval of each commutation phase is 120 electrical degrees, and two phases conduct at any given time. The PWM signals 130 may be generated using several different PWM control schemes. As an example, FIGS. 6A, 6B, 6C, 6D, 6E and 6F depict the control signals for the MOSFETs 520, 524, 526, 528, 530 and 532 for a high side PWM control scheme.

In accordance with example embodiments, high side PWM control may be used if the MOSFETs 520, 526 and 530 (see FIG. 5) are N-channel enhancement-type MOSFETs. A particular advantage of using the high side PWM control scheme is that a single PWM signal is active at any given time. Another potential advantage is that the bootstrap capacitor of the high side driver of an N-channel MOSFET may receive enough charge when its low side MOSFET conducts.

Figure 7A:
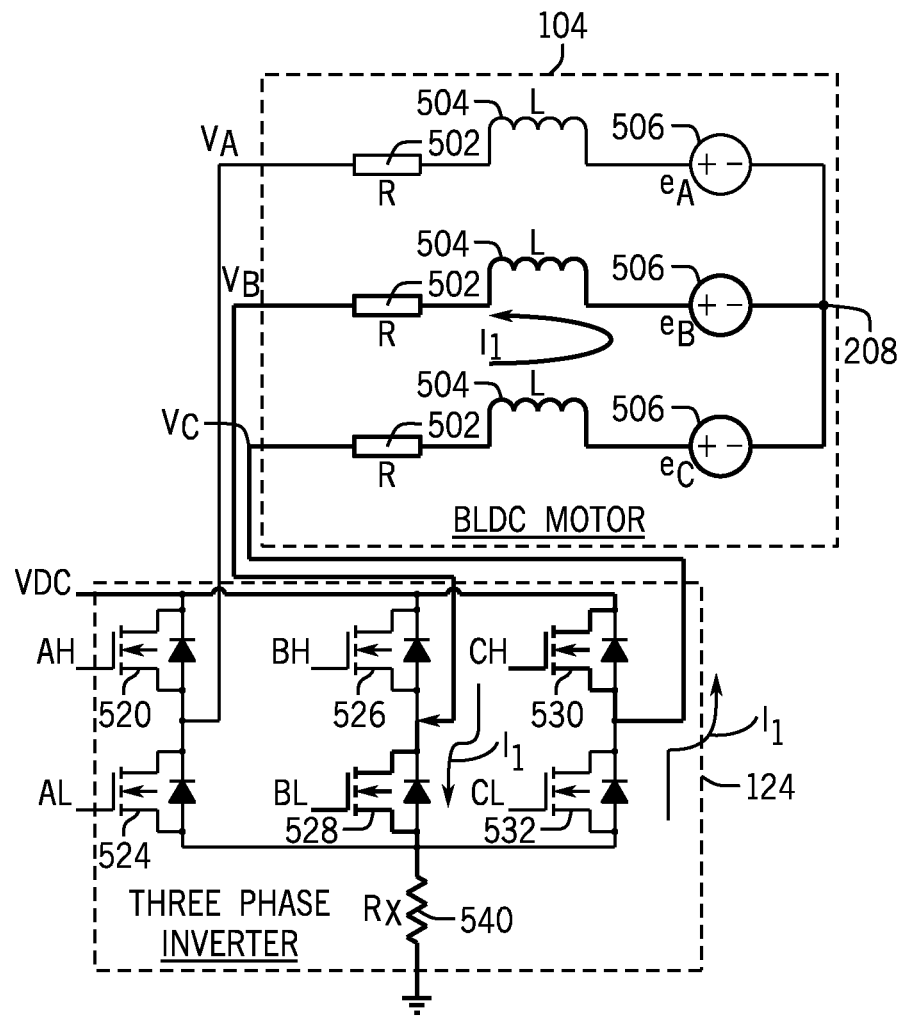
FIG. 7A is an illustration of a current flow in the BLDC motor and three phase inverter of FIG. 5 during a PWM on time according to an example embodiment.

Assuming the high side PWM control scheme, FIG. 7A depicts the current path of the BLDC motor 104 for the high side PWM control scheme when the MOSFET 530 is turned on during an on time of the PWM cycle. In this regard, the on time of a given PWM cycle is a time in which the MOSFET conducts (for this example, when the drain-to-source path of the MOSFET 530 conducts). As can be seen from FIG. 7A and the motor model of FIG. 5, a current (called "$I_1$") exists in the stator windings 204-B and 204-C. As also depicted in FIG. 7A, no current flows in the stator winding 204-A, which is the "open" winding for this phase.

Figure 7B:
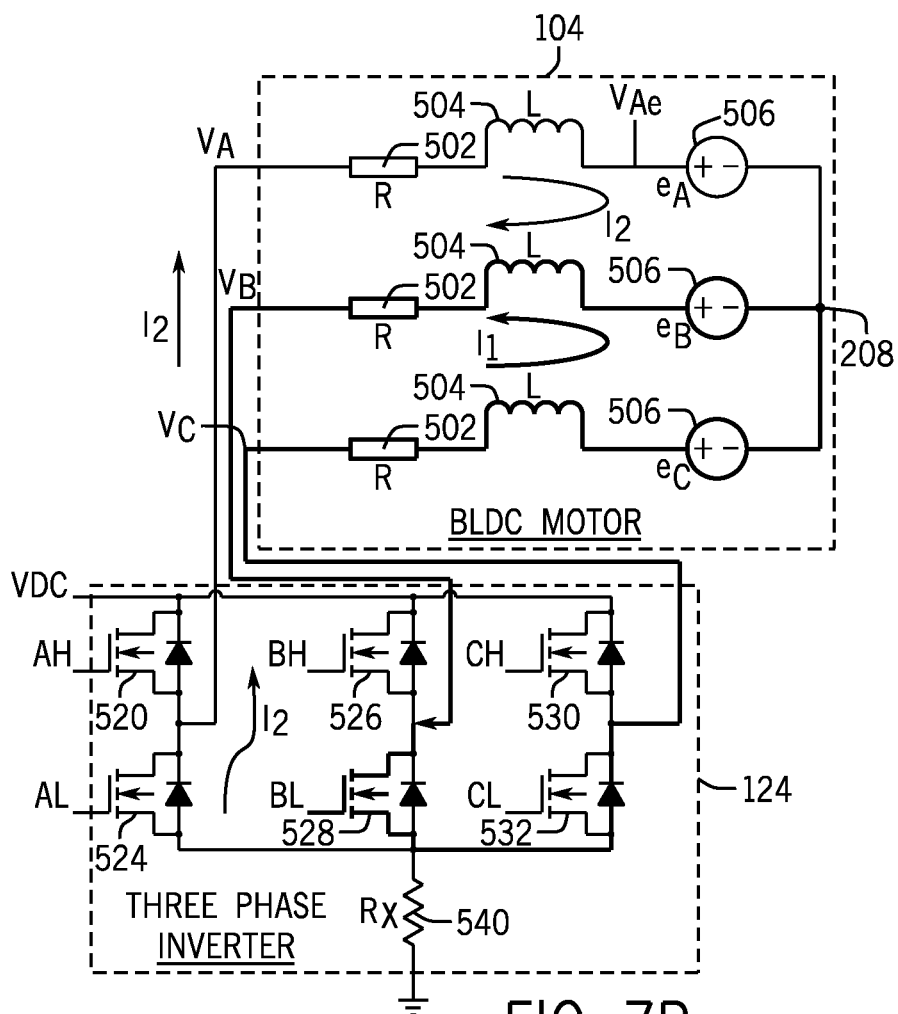
FIG. 7B is an illustration of a current flow in the BLDC motor and three phrase inverter of the BLDC motor of FIG. 5 during an initial portion of a PWM off time according to an example embodiment.

Referring to FIG. 7B, although ideally no current exists in the stator winding 204-A during the PWM off time for the phase A, a bulk diode 533 of the MOSFET 532 conducts to cause a leakage current (called $I_2$") in the "open" stator winding 204-A. In particular, as further described herein, the $I_2$ leakage current occurs during the initial part of the PWM off cycle. It is noted that if the terminal voltage of the stator winding 204-A is sensed during this initial portion of the PWM off cycle, an incorrect measurement of the back emf is obtained, and as such, an incorrect zero crossing of the back emf may be detected.

More specifically, if it is assumed the forward bias voltage of the body diode of the MOSFET 532 is "$V_{FCL}$," then during the initial part of the off phase, the following applies:

$$V_C = -V_{FCL}, \text{ and} \quad \text{Eq. 1}$$

$$V_B = 0, \quad \text{Eq. 2}$$

where "$V_B$" and "$V_C$" are the terminal voltages of the stator windings 204-B and 204-C, respectively. The actual neutral point voltage of the stator may be described as follows:

$$V_N = -V_{FCL}/2 \quad \text{Eq. 3}$$

The voltage after back emf source 506 of the stator winding 204-A, called "$V_{Ae}$," may be described as follows:

$$V_{Ae} = V_N + e_A = e_A - V_{FCL}/2, \quad \text{Eq. 4}$$

If the minimum forward diode voltage required for current to flow, called "$V_{Fmin}$," then current exists in the open phase if the following conditions are met:

$$V_{Ae} < -V_{Fmin}, \text{ and} \quad \text{Eq. 5}$$

$$e_A < \frac{V_{FCL}}{2} - V_{Fmin}. \quad \text{Eq. 6}$$

During commutation phase 1 (see Table 1 above), when the back emf of the stator winding 204-A is rising and the zero crossing point has not yet occurred, the voltage of the back emf 506 of the winding 204-A is negative. Therefore, it is possible for the conditions of Eqs. 5 and 6 to be met. When this occurs, the actual $V_A$ terminal voltage when the body diode of the MOSFET 532 conducts may be described as follows:

$$V_A = -V_{FAL} \leq -V_{Fmin}, \quad \text{Eq. 8}$$

The virtual neutral voltage can be described as follows:

$$V_Y = -\tfrac{1}{3}(V_{FAL} + V_{FCL}). \quad \text{Eq. 9}$$

When PWM is off and current flows in the open terminal, the comparison relationship is:

$$V_Y - V_A = -\tfrac{1}{3}(-2^* V_{FAL} + V_{FCL}). \quad \text{Eq. 10}$$

This small valued current flowing in the open terminal may or may not decay to zero before the PWM returns to the PWM on cycle. Therefore, detection of the back emf zero crossing on this terminal may be inaccurate. Moreover, parasitic capacitance across the drain-source terminals of the power MOSFETs may introduce a "ringing" signal component at the motor terminals.

When the current in the open terminal decays to zero, current path returns to the one illustrated in FIG. 7A. For this states, the $V_A$ and $V_Y$ voltages may be described as follows:

$$V_A = V_{Ae} = e_A - V_{FCL}/2, \text{ and} \quad \text{Eq. 11}$$

$$V_Y = \tfrac{1}{3}(e_A - 3^* V_{FCL}/2). \quad \text{Eq. 12}$$

The comparison relationship is still the same as when PWM is on:

$$V_Y - V_A = -\tfrac{2}{3} e_A \quad \text{Eq. 13}$$

Other PWM control schemes may incur related back emf currents for the open stator windings. In this regard, there are a number of different ways in which the three phase inverter 124 may be controlled. A low side PWM is another manner in which the MOSFETs of the inverter 124 may be controlled, as illustrated in FIGS. 8A-8F. The low side PWM control scheme may be used when the high side MOSFETs 520, 526 and 530 are P-channel type MOSFETs. As with the high side PWM control scheme, the low side PWM control scheme has the advantage of a single PWM signal being active at any one time.

FIGS. 9A, 9B, 9C, 9D, 9E and 9F depict a complementary high side PWM control scheme, which may be advantageous when high side MOSFETs 520, 526 and 530 are N-channel type MOSFETs. This control scheme may be particularly advantageous for heat problems because re-circulation current passes through the low side MOSFETs instead of through the body diode.

FIGS. 10A, 10B, 10C, 10D, 10E and 10F depict a complementary low side PWM control scheme. This control scheme may be used when the high side MOSFETs 520, 526 and 530 are N-channel types. This scheme has similar advantages to the advantages described above for the complementary high side PWM control scheme.

FIGS. 11A, 11B, 11C, 11D, 11E and 11F depict a mixed mode PWM control scheme, which is a combination of high side and low side PWM. A particular advantage of mixed mode PWM is its simplicity in implementation in that one active PWM signal occurs at any one time. For this control scheme, both the high side (MOSFETs 520, 526 and 530) and the low side (MOSFETs 524, 528 and 532) MOSFETs may be N-channel type MOSFETs. A particular advantage for this control scheme is that the recirculation current load is shared between the body diodes of all of the MOSFETs. Therefore, a particular advantage is that the mixed mode PWM control scheme may offer long term reliability, as compared to other PWM control schemes.

Regardless of which of the above-described PWM control schemes are used, there are certain conditions during the off time of the PWM cycle, which may cause a current to exist in the open stator winding, thereby adversely affecting detection of a back emf zero crossing on this winding. In this manner, the current exists in the open stator winding during a portion of the PWM off cycle for the other PWM control schemes as well. For example, for the low side PWM control scheme, similar analysis may be applied to obtain the voltages for low-side PWM during the off phase. In this regard, for the low side PWM control scheme, a bulk diode 531 of the MOSFET 530 may cause the current in the open stator winding (here, the stator winding 204-A, for this example). The following conditions apply for this analysis:

$$V_B = V_{DC}, \quad \text{Eq. 13}$$

$$V_C = V_{DC} + V_{FCH}, \quad \text{Eq. 14}$$

$$V_N = V_{DC} + V_{FCH}/2, \text{ and} \quad \text{Eq. 15}$$

$$V_{Ae} = V_N + e_A = e_A + V_{DC} + V_{FCH}/2. \quad \text{Eq. 16}$$

And the inequality condition to satisfy to achieve current flow may be described as follows:

$$V_{Ae} > V_{DC} + F_{Fmin}, \text{ and} \quad \text{Eq. 17}$$

$$e_A > V_{Fmin} - \frac{V_{FCH}}{2}. \quad \text{Eq. 18}$$

The $V_A$ and $V_Y$ voltages may be described as follows:

$$V_A = V_{DC} + V_{FAH}, \text{ and} \quad \text{Eq. 19}$$

$$V_Y = V_{DC} + \tfrac{1}{3}(V_{FAH} + V_{FCH}). \quad \text{Eq. 20}$$

The corresponding comparison relationship may be described as follows:

$$V_Y - V_A = \frac{1}{3}(-2 * V_{FAH} + V_{FCH}),\quad \text{Eq. 21}$$

When the open terminal current decays to zero, the $V_A$ and $V_Y$ voltages may be described as follows:

$$V_A = V_{Ae} = e_A + V_{DC} + V_{FCH}/2, \text{ and}\quad \text{Eq. 22}$$

$$V_Y = V_{DC} + \frac{1}{3}\left(e_A + 3 * \frac{V_{FCH}}{2}\right).\quad \text{Eq. 23}$$

The comparison relationship is still the same as when PWM is on:

$$V_Y - V_A = -\tfrac{2}{3} e_A.\quad \text{Eq. 24}$$

The following table presents a summary of the terminal voltage comparison with the virtual neutral point voltage:

TABLE 2

Terminal voltage comparison equations

| Active PWM state | VY-VA equation |
|---|---|
| PWM on | $V_Y - V_A = -\tfrac{2}{3} e_A$ |
| High-side/Low-side PWM off, zero current flows in open terminal A | $V_Y - V_A = -\tfrac{2}{3} e_A$ |
| High-side PWM off, non-zero current flows in open terminal A | $V_Y - V_A = -\tfrac{1}{3}(-2 * V_{FAL} + V_{FCL})$ Conditional on: $e_A < \frac{V_{FCL}}{2} - V_{Fmin}$ |
| Low-side PWM off, non-zero current flows | $V_Y - V_A = \tfrac{1}{3}(-2 * V_{FAH} + V_{FCH})$ Conditional on: |

TABLE 2-continued

Terminal voltage comparison equations

| Active PWM state | VY-VA equation |
|---|---|
| in open terminal A | $e_A > V_{Fmin} - \frac{V_{FCH}}{2}$ |

Figure 12A:
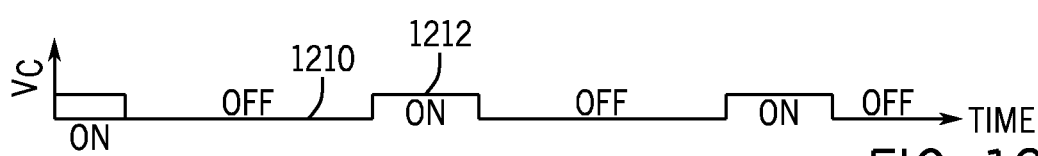
FIG. 12A is a PWM stator winding waveform having a relatively low duty cycle according to an example embodiment.
Figure 12B:
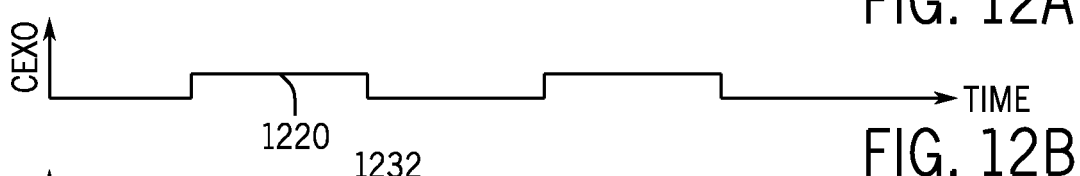
FIG. 12B is a waveform of a tracking signal used in connection with the PWM stator winding waveform of FIG. 12A to control when an open stator winding is sensed to detect a zero crossing of a back electromotive force according to an example embodiment.

FIG. 12A depicts an example $V_C$ terminal voltage applied to the stator winding 204-C and FIG. 12B depicts an example tracking signal (called "CEX0"), which is used to control the sensing of the zero crossing from the $V_C$ terminal voltage. In particular, FIGS. 12A and 12B depict the CEX0 signal for the case when the $V_C$ voltage is a PWM signal that has a relatively low duty cycle. In this regard, the duty cycle refers to the ratio of the on time of the PWM signal to the off time. In this context, a relatively "low" PWM signal refers to the on time being less than one half of the period of the PWM signal in accordance with example embodiments. For the relatively low duty cycle, the CEX0 signal is asserted (asserted at reference numeral 1220, for example), or driven high, which enables the sensing of the $V_A$ terminal voltage.

Figure 12C:
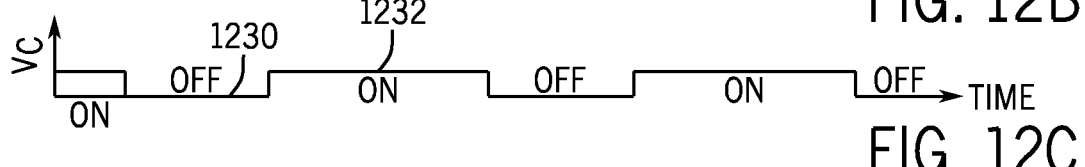
FIG. 12C is an example PWM stator winding waveform having a relatively high duty cycle according to an example embodiment.
Figure 12D:
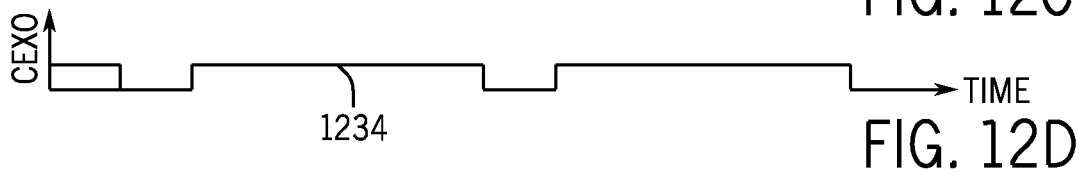
FIG. 12D is a waveform of a tracking signal used in connection with the PWM stator winding waveform of FIG. 12C to control when an open stator winding is sensed to detect a zero crossing of a back electromotive force according to an example embodiment.
Figure 8A:
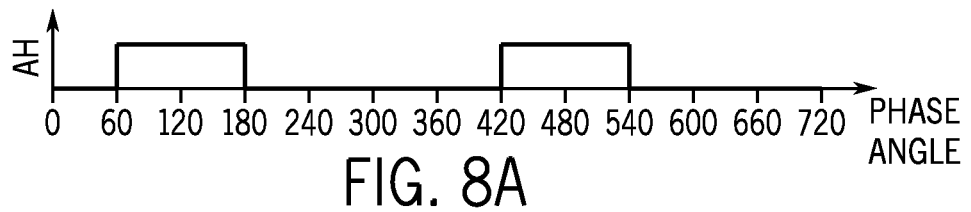
FIGS. 8A, 8B, 8C, 8D, 8E and 8F are waveforms depicting a low side PWM scheme for controlling a BLDC motor according to an example embodiment.
Figure 8B:
Figure 8C:
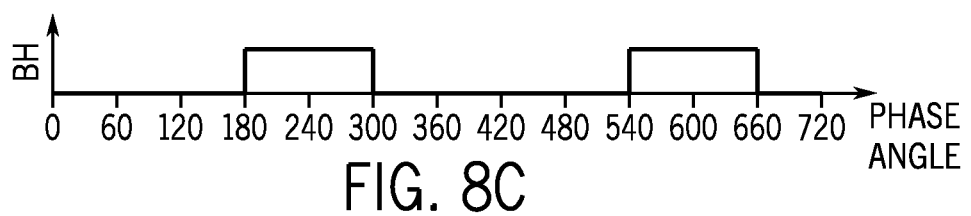
Figure 8D:
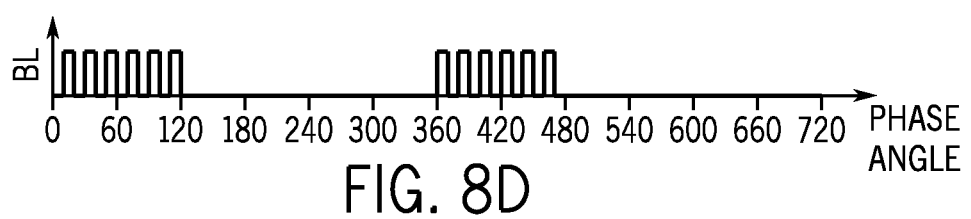
Figure 8E:
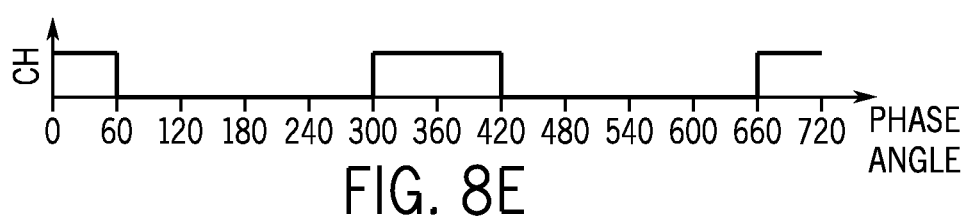
Figure 8F:
Figure 9A:
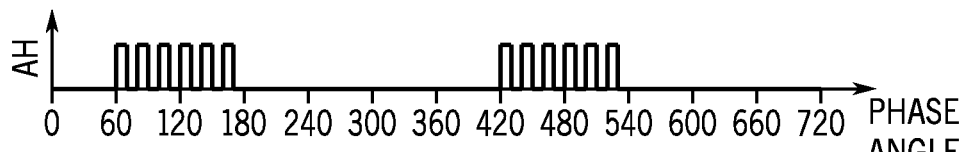
FIGS. 9A, 9B, 9C, 9D, 9E and 9F are waveforms depicting a complementary high side PWM scheme for controlling a BLDC motor according to an example embodiment.
Figure 9B:
Figure 9C:
Figure 9D:
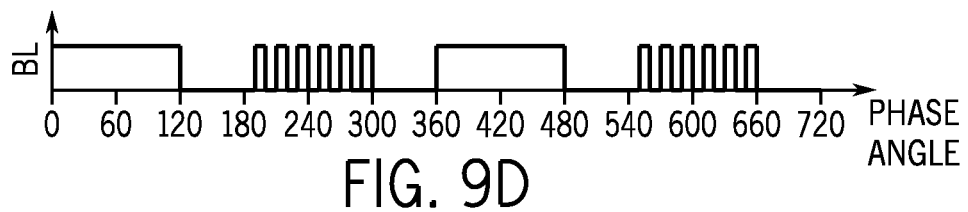
Figure 9E:
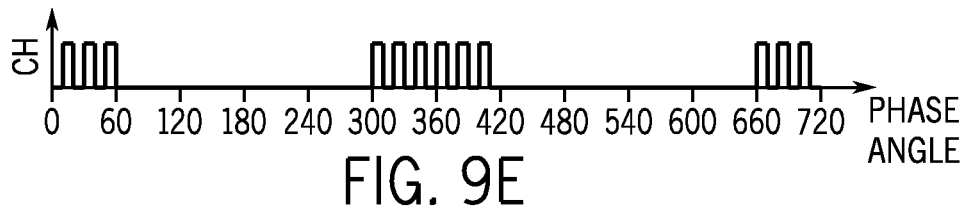
Figure 9F:
Figure 10A:
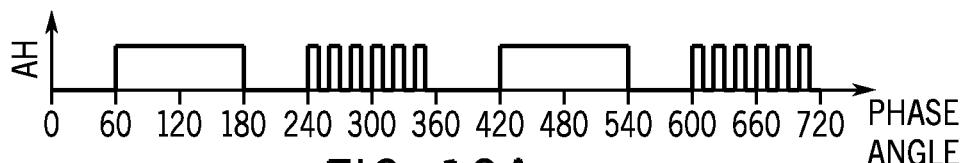
FIGS. 10A, 10B, 10C, 10D, 10E and 10F are waveforms depicting a complementary low side PWM scheme for controlling a BLDC motor according to an example embodiment.
Figure 10B:
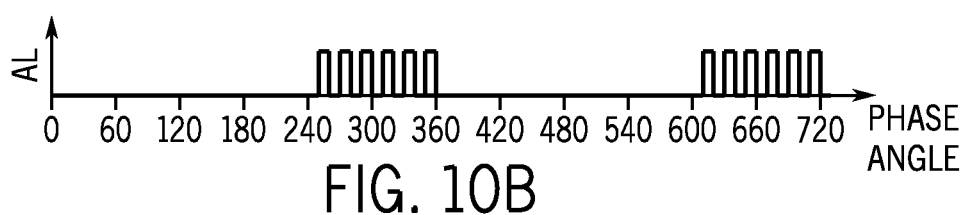
Figure 10C:
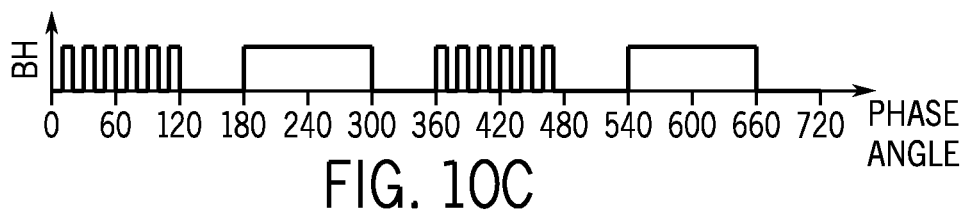
Figure 10D:
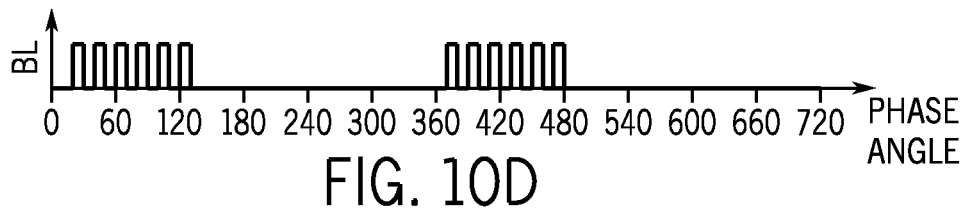
Figure 10E:
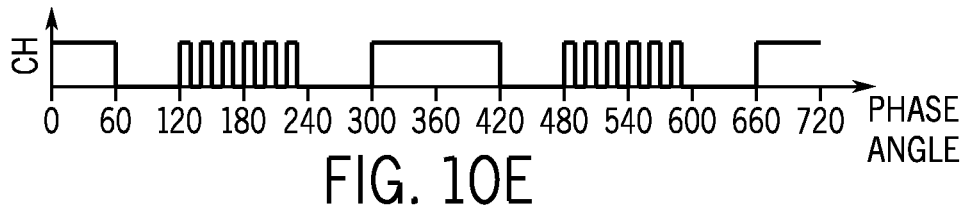
Figure 10F:
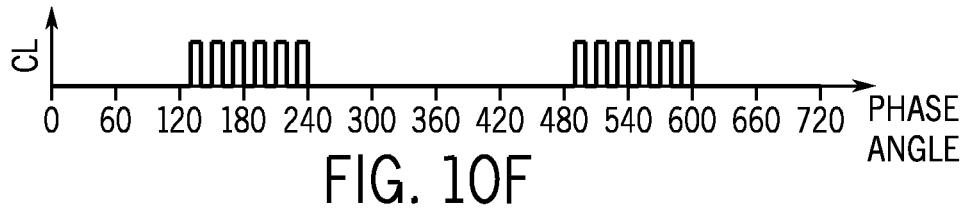
Figure 11A:
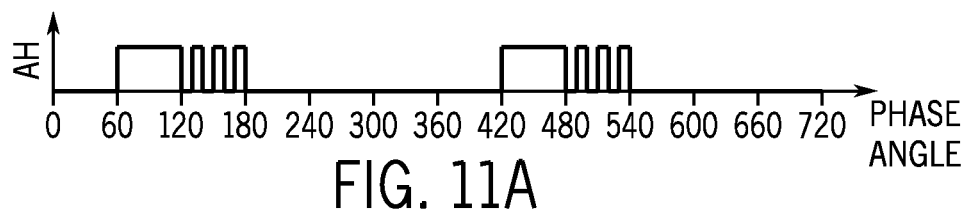
FIGS. 11A, 11B, 11C, 11D, 11E and 11F are waveforms depicting a mixed mode PWM scheme for controlling a BLDC motor according to an example embodiment.
Figure 11B:
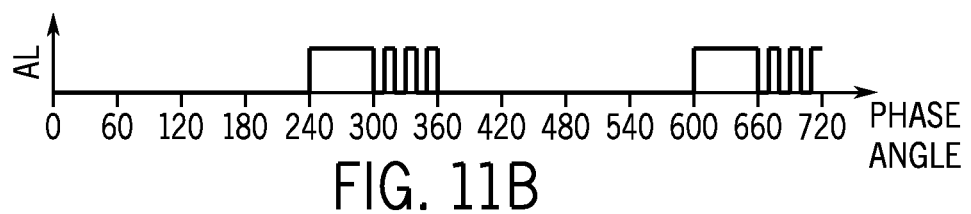
Figure 11C:
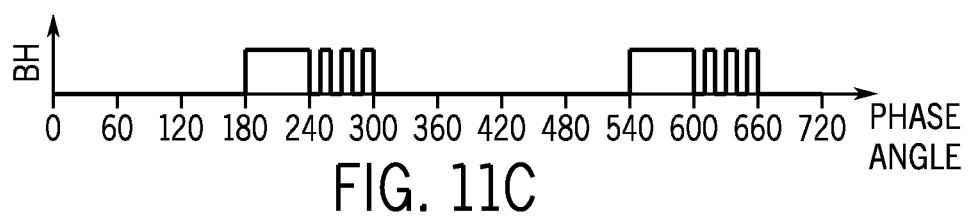
Figure 11D:
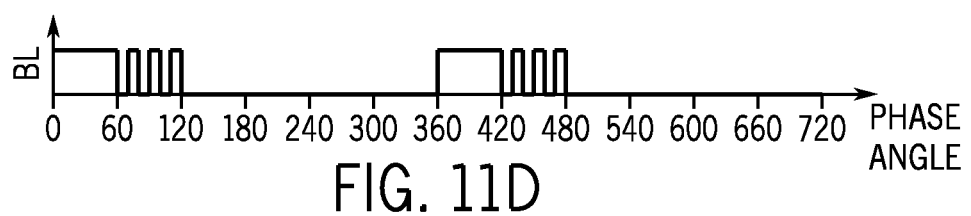
Figure 11E:
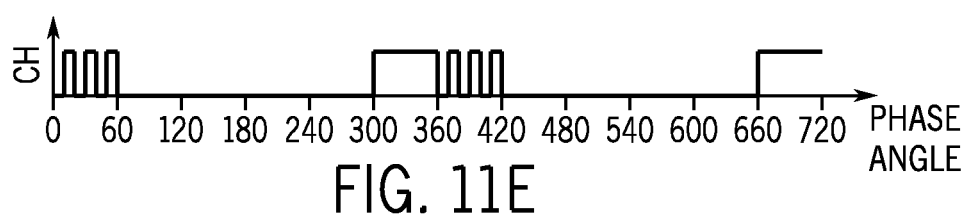
Figure 11F:
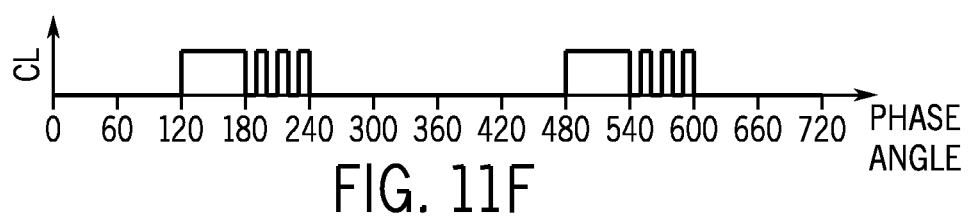

For a relatively high duty cycle (a duty cycle greater than or equal to fifty percent, for example), the off time of the PWM signal is significantly reduced. Therefore, when the PWM signal has a relatively high duty cycle, the CEX0 signal may be asserted (driven high, for example) for the latter portion of an off time 1230 (see FIG. 12C) of the $V_C$ signal and for the subsequent on time of the PWM signal. Thus, as illustrated by asserted portion 1234 of the CEX0 signal in FIG. 12D, the zero crossing detection occurs during the latter portion of the PWM off time as well as the on time of the PWM signal.

Based on the different PWM control techniques and the back electromotive force zero crossing point detection techniques, peripheral configuration sequences for three different PWM control schemes may be obtained. As examples, the peripheral assignment sequences for the three different PWM modes for rotation in a specific direction are set forth below:

TABLE 3

High-side PWM peripheral configuration sequence

| State | Gate Drive Outputs | | | | | | BEMF | | | |
| | High-side | | | Low-side | | | | | | |
| | AH | BH | CH | AL | BL | CL | Open phase | Slope | CP0+ | CP0− and CEX0 |
|---|---|---|---|---|---|---|---|---|---|---|
| 0 | PWM | L | L | L | H | L | C | Falling | VMC | VMY |
| 1 | L | L | PWM | L | H | L | A | Rising | VMY | VMA |
| 2 | L | L | PWM | H | L | L | B | Falling | VMB | VMY |
| 3 | L | PWM | L | H | L | L | C | Rising | VMY | VMC |
| 4 | L | PWM | L | L | L | H | A | Falling | VMA | VMY |
| 5 | PWM | L | L | L | L | H | B | Rising | VMY | VMB |

TABLE 4

Low-side PWM peripheral configuration sequence

| State | Gate Drive Outputs | | | | | | BEMF | | | |
| | High-side | | | Low-side | | | Open | | | |
| | AH | BH | CH | AL | BL | CL | phase | Slope | CP0+ | CP0− and CEX0 |
|---|---|---|---|---|---|---|---|---|---|---|
| 0 | H | L | L | L | PWM | L | C | Falling | VMC | VMY |
| 1 | L | L | H | L | PWM | L | A | Rising | VMY | VMA |
| 2 | L | L | H | PWM | L | L | B | Falling | VMB | VMY |

TABLE 4-continued

Low-side PWM peripheral configuration sequence

| | Gate Drive Outputs | | | | | | BEMF | | |
|---|---|---|---|---|---|---|---|---|---|
| | High-side | | | Low-side | | | Open | | CP0− and |
| State | AH | BH | CH | AL | BL | CL | phase | Slope | CP0+ | CEX0 |
| 3 | L | H | L | PWM | L | L | C | Rising | VMY | VMC |
| 4 | L | H | L | L | L | PWM | A | Falling | VMA | VMY |
| 5 | H | L | L | L | L | PWM | B | Rising | VMY | VMB |

TABLE 5

Mixed mode PWM peripheral configuration sequence

| | Gate Drive Outputs | | | | | | BEMF | | |
|---|---|---|---|---|---|---|---|---|---|
| | High-side | | | Low-side | | | Open | | CP0− and |
| State | AH | BH | CH | AL | BL | CL | phase | Slope | CP0+ | CEX0 |
| 0 | H | L | L | L | PWM | L | C | Falling | VMC | VMY |
| 1 | L | L | PWM | L | H | L | A | Rising | VMY | VMA |
| 2 | L | L | H | PWM | L | L | B | Falling | VMB | VMY |
| 3 | L | PWM | L | H | L | L | C | Rising | VMY | VMC |
| 4 | L | H | L | L | L | PWM | A | Falling | VMA | VMY |
| 5 | PWM | L | L | L | L | H | B | Rising | VMY | VMB |

Figure 17:
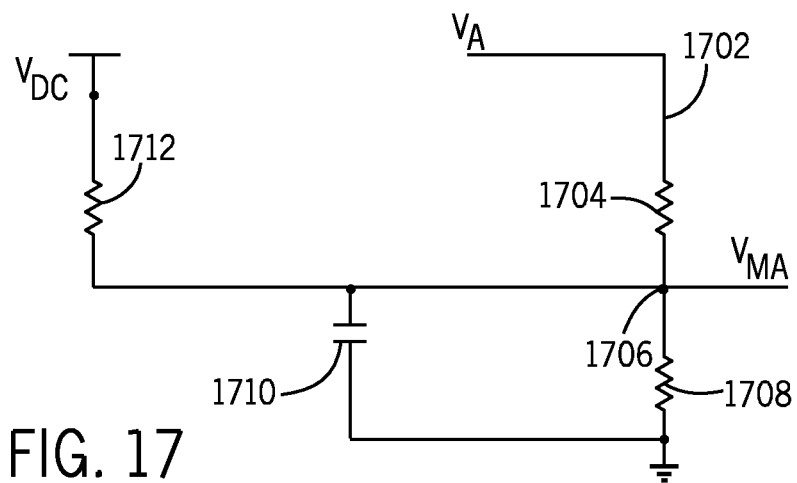
FIG. 17 is a schematic diagram of a filtering/attenuation circuit to generate a signal representing a terminal voltage of the BLDC motor according to an example embodiment.
Figure 13A:
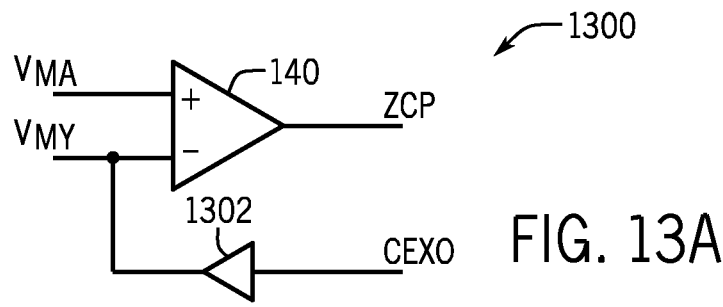
FIG. 13A is a schematic diagram of comparator circuitry used to sense a zero crossing of a rising back electromotive force according to an example embodiment.
Figure 13B:
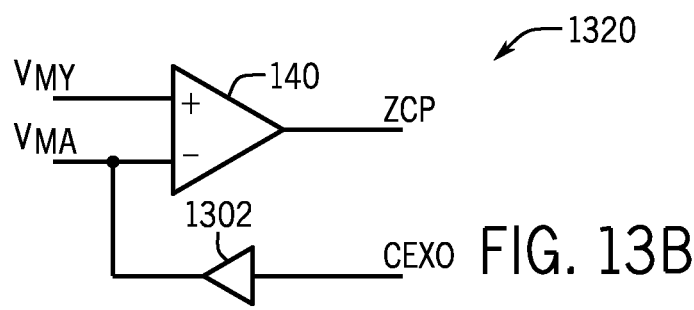
FIG. 13B is a schematic diagram of comparator circuitry used to sense a zero crossing of a falling back electromotive force according to an example embodiment.

Referring to FIGS. 13A and 13B in conjunction with FIG. 1, in accordance with some embodiments, the comparator 140 may be used in two different configurations for purposes of detecting back emf zero crossings. In this regard, in accordance with example embodiments, FIG. 13A depicts comparator circuitry 1300, which shows the comparator 140 being configured to detect zero crossing when the back emf is falling. For this configuration, the non-inverting input terminal of the comparator 140 is coupled to receive a $V_{MA}$ voltage (indicative of the monitored $V_A$ stator terminal voltage). Referring to FIG. 17, the $V_{MA}$ voltage may be generated by filtering/attenuation circuit 1702. As shown in FIG. 17, in accordance with example embodiments, the $V_{MA}$ voltage is provided by a node 1706 that is coupled to the $V_A$ voltage through a resistor 1704 and coupled to ground through a resistor 1708. A capacitor 1710 is coupled between the node 1706 and ground, and another resistor 1712 is coupled between the node 1706 and the $V_{DC}$ voltage.

Referring back to FIG. 13A, the inverting terminal of the comparator 140 receives the $V_{MY}$ voltage (indicative of the monitored $V_Y$ virtual neutral voltage). The output terminal of the comparator 140 provides a signal (called "ZCP"), which is asserted (driven to a logic zero, for example) to indicate a zero crossing and de-asserted otherwise.

The CEX0 tracking signal is communicated to an open collector buffer 1302, whose output terminal is coupled to the inverting input of the comparator 140. The output terminal of the comparator 140 has a logic one level before zero crossing detection and is driven to a logic zero value to indicate the zero crossing detection. In accordance with example embodiments, the non-inverting input, inverting input and output terminals of the comparator 140 are coupled to pull-up resistors in the filtering/attenuation circuit (e.g. resistor 1712 of the circuit 1702).

Thus, when the CEX0 signal is de-asserted (driven to a logic zero, for example), the inverting input terminal of the comparator 140 remains asserted to prevent the comparator 140 from indicating a zero crossing detection (the ZCP signal remains at a logic one level, for example).

FIG. 13B depicts a comparator circuitry 1320, in which the comparator 140 is configured to detect a zero crossing for a rising back emf. For this configuration, the non-inverting input terminal of the comparator 140 receives the $V_{MY}$ voltage, and the inverting input terminal of the comparator 140 receives the $V_{MA}$ voltage.

A multiplexer circuit (not shown in FIGS. 13A and 13B) may be used to control routing of the $V_{MA}$ and $V_{MY}$ voltages of the inverting and non-inverting terminals of the comparator 140 for purposes of configuring the comparator 140 to detect zero crossings for either a rising (FIG. 13A) or falling (FIG. 13B) back emf. Moreover, the circuitry of FIGS. 13A and 13B may be used to detect zero crossings for other windings, as a multiplexer circuit (not shown in FIGS. 13A and 13B) may select the particular indicated terminal voltage ($V_{MA}$, $V_{MB}$ for the stator winding 204-B or $V_{MC}$ for the stator winding 204-C), depending on the stator winding that is currently open in the commutation sequence. It is noted that the $V_{MB}$ and $V_{MC}$ voltages may be generated by circuits, similar to the circuit 1702 of FIG. 17.

Thus, in accordance with some embodiments, the controller 100 (see FIG. 1) may have a single comparator 140, which is selectively configured by a multiplexer circuit to, for each phase of the commutation sequence, sense rising and falling back emf zero crossings at the appropriate times, as controlled by a tracking signal.

Figure 14:
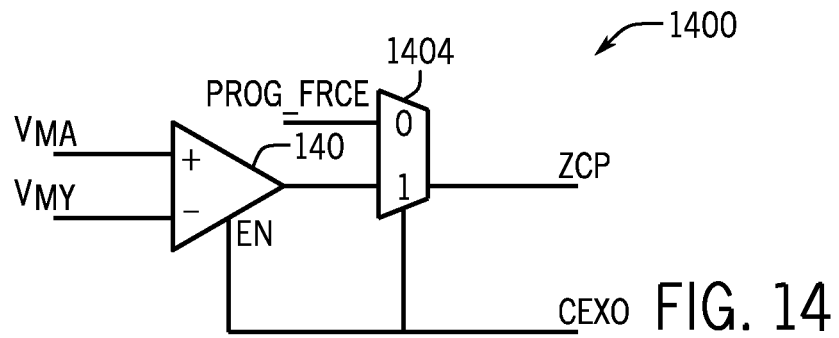
FIG. 14 is a schematic diagram illustrating comparator circuitry to sense a zero crossing of either a rising or falling back electromotive force according to an example embodiment.
Figure 15:
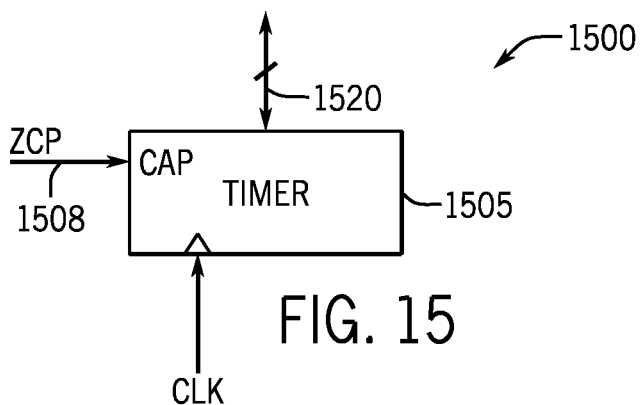
FIG. 15 is a schematic diagram of circuitry to capture a timing of a zero crossing of a back electromotive force according to an example embodiment.

Other embodiments are contemplated, which are within the scope of the appended claims. For example, FIG. 14 depicts comparator circuitry 1400 in which the inverting and non-inverting inputs of the comparator 140 are not juxtaposed for purpose detecting rising and falling zero crossings. For the comparator circuitry 1400, an output terminal of the comparator 140 is connected to one input of a multiplexer 1404. The other terminal of the multiplexer 1404 receives an input voltage called "PROG_FRCE" which is programmable forced output value for the comparator output 140 and has a logic level depending on whether a rising or falling zero crossing is being detected. The output terminal of the multiplexer 1404 provides the ZCP zero crossing detection signal. The selection terminal of the multiplexer 1404 receives the CEX0 tracking signal, which is also received by an enable input of the comparator 140.

In accordance with some embodiments, the controller 100 may include a circuit 1500 that captures the time at which the zero crossing event is detected. For example, in accordance with some embodiments, the circuit 1500 includes a timer 1505 that is clocked by a clock signal CLK. The ZCP signal is received at a capture input 1504 of the time 1505 so that when the ZCP signal is asserted, the timer 1505 captures a value indicative of a time of the zero crossing event. This time may then be read by the controller using address/data signals 1520.

Figure 16:
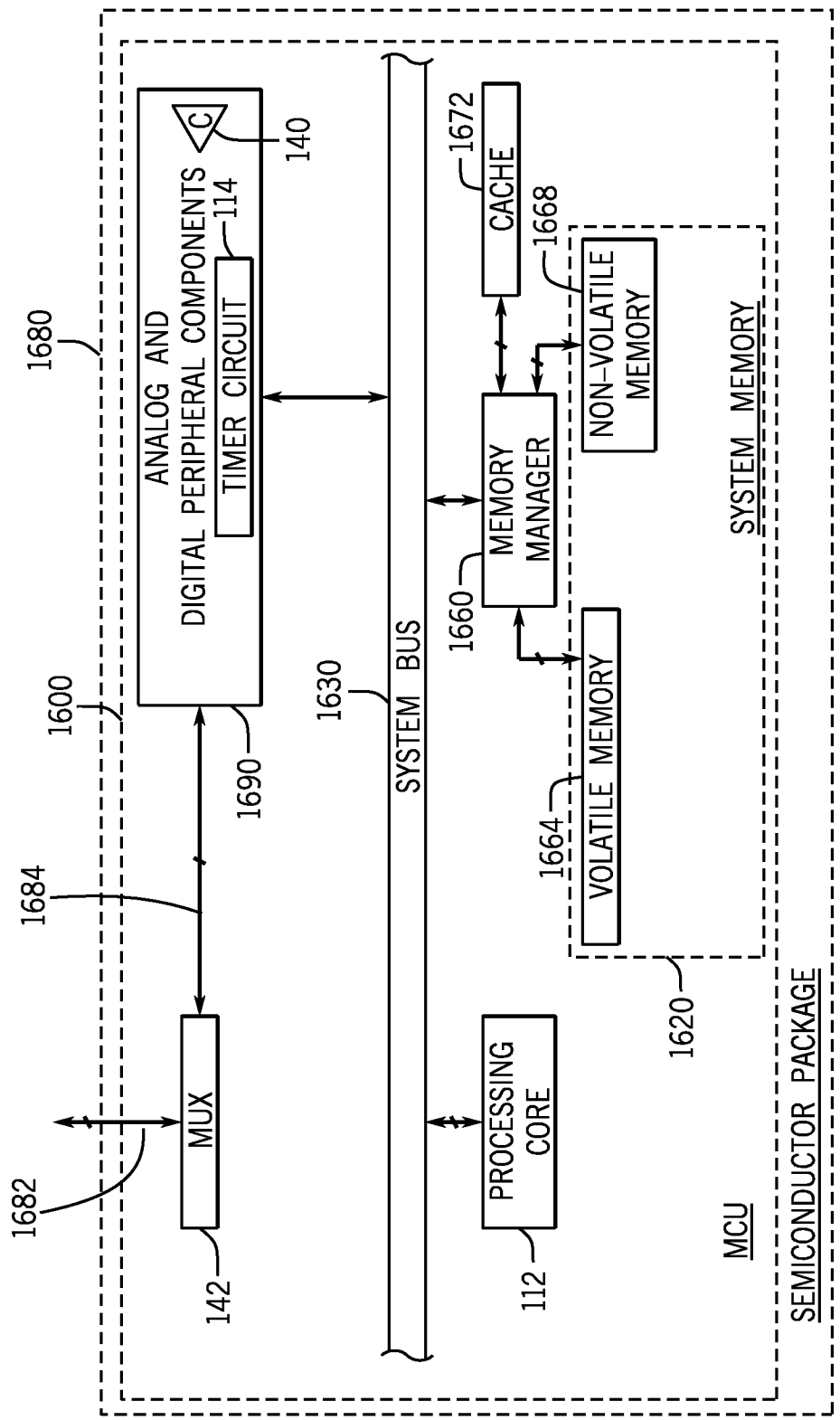
FIG. 16 is a schematic diagram of a microcontroller unit (MCU) according to an example embodiment.

Referring to FIG. 16, in accordance with some embodiments, the controller 110 (FIG. 1) may be formed by a microcontroller unit (MCU) 1600. All or part of the components of the MCU 1600 may be part of an integrated circuit (IC). As examples, all or part of the components of the MCU 1600 may be fabricated on a single die or on multiple dies. The IC may be packaged to form a semiconductor package 1680.

Among its components, the MCU 1600 includes a processing core 112 and an analog and digital peripheral components 1690, which include the timer circuit 114. As a more specific example, the timer circuit 114 may be a programmable counter array (PCA) to generate PWM signals and other signals that are provided to the three phase inverter 124 (see FIG. 1) for purposes of generating the PWM signals 130. The processing core 112 may regulate the frequency, duty cycle and general timings of these signals by programming the PCA appropriated for purposes of controlling the commutation sequence for the BLDC motor 104.

The processing core 112 may further program the PCA generate the CEX0 tracking signal, which is synchronized to the PWM signals 130, for purposes of indicating when the comparator 140 is to sense for back emf zero crossings, as described herein. Thus, in accordance with example embodiments, the processing core 112 may not be directly involved with controlling each instance when the comparator is and is not enabled to sense for a zero crossing, as the CEX0 tracking signal runs with processor core intervention. A particular advantage of this arrangement is that processor core overhead associated with managing zero crossing detection may be minimized, and relatively high speed BLDC motors (a motor in which successive back emf zero crossings may occur within five PWM cycles, for example) may be controlled.

The components 1690 may also include at least one comparator 140 and/or comparator circuits, as described herein, which have inputs that are selectively coupled to sense different stator windings by a multiplexer circuit 142 (a crossbar switch, as an example). In this manner, in accordance with some embodiments, the multiplexer circuit 142 may be programmed by the processing core 112 to selectively multiplex connections between inputs/outputs (I/Os) 1682 that are coupled to components of the system 100 (see FIG. 1) outside of the controller and I/Os 1684 that are coupled to the analog and digital components 1690 of the MCU 1600. Thus, in general, the multiplexing circuit 142 multiplexes I/O signals to/from the MCU 1600 as appropriate to control the sensing of the back emf, sensing of the motor terminal terminals, sensing of any other feedback from the motor 104 (such as a current) and produce the control signals for causing the MOSFETs of the phase inverter 124 to generate the PWM signal s 130 to control the BLDC motor 104.

In accordance with example embodiments, the analog components of the components 1690 may include various analog-to-digital converters (ADCs), digital-to-analog converters (DACs), other comparators; analog components that provide analog signals, such as current drivers; and so forth. The digital components of the components 1690 may communicate with the processing core 112 over the system bus 1630. As examples, the digital components may include a Universal Serial Bus (USB) interface, a UART interface, a system management bus interface (SMB) interface, an SPI interface, and so forth. In general, these digital components communicate with devices that are external to the MCU 1600 via I/O terminals.

As an example, the processing core 112 may be a 32-bit core, such as the Advanced RISC Machine (ARM) processing core, which executes a Reduced Instruction Set Computer (RISC) instruction set. However, in further embodiments, other processing cores (an 8051 processing core, for example) may be used. In general, the processing core 112 communicates with various other system components of the MCU 1600, such as a memory controller, or manager 1660, over a system bus 1630. In general, the memory manager 1660 controls access to various memory components of the MCU 1600, such as a cache 1672, a non-volatile memory 1668 (a Flash memory, for example) and a volatile memory 1664 (a static random access memory (SRAM), for example). As depicted in FIG. 2, the volatile memory 1664 and the non-volatile memory 1668 may form the system memory 1620 of the MCU 1600. In other words, the volatile memory 1664 and the non-volatile memory 1668 have memory locations that are part of the system memory address space for the MCU 1600.

It is noted that FIG. 16 depicts a block diagram representation of the MCU architecture, as the MCU 1600 may have many other components, bridges, buses, and so forth, in accordance with other exemplary embodiments. For example, in accordance with some embodiments, the MCU 1600 may have a bus matrix module that implements slave side arbitration and is used to regulate access to the memory devices of the MCU 1600.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
   using a processing core to regulate at least one characteristic of a first signal used to drive a first stator winding of a brushless direct current (BLDC) motor;
   using a peripheral component to generate a tracking signal in response to the first signal, the tracking signal indicating times to sense a back electromotive force of a second stator winding of the BLDC motor; and
   sensing the back electromotive force in response to the tracking signal, wherein the sensing comprises selectively isolating a back electromotive force sensor from the second stator winding based on additional non-sensing times indicated by the tracking signal.

2. The method of claim 1, wherein the peripheral component comprises a programmable counter array, the method further comprising using the programmable counter array to generate the first signal.

3. The method of claim 1, wherein the first signal comprises a PWM signal, the method further generating the tracking signal based at least in part on a timing of time intervals within off times of the PWM signal.

4. The method of claim 1, wherein:
using the processing core comprises providing at least one signal to an inverter to cause the inverter to provide the first signal to the first stator winding; and
generating the tracking signal comprises generating the tracking signal based at least in part on a characteristic of a body diode of a transistor of the inverter.

5. The method of claim 1, wherein:
the first signal comprises a PWM signal; and
generating the tracking signal comprises generating the tracking signal based at least in part on a predetermined proportion of an off time of the PWM signal.

6. The method of claim 1, wherein:
the first signal comprises a PWM signal; and
generating the tracking signal comprises generating the tracking signal based at least in part on a duty cycle of the PWM signal.

7. An apparatus comprising:
a controller to:
generate pulse width modulation (PWM) signals to drive stator windings of a brushless direct current (BLDC) motor in a commutation sequence such that one of the stator windings at a given time is open;
generate a tracking signal synchronized to the PWM signals and indicative of times when a leakage current is present in the open stator winding; and
a comparator to sense when a back electromotive force of the open stator winding has an associated zero crossing, the sensing by the comparator being selectively enabled and disabled by the tracking signal.

8. The apparatus of claim 7, wherein the comparator comprises an output and an input, and the tracking signal is coupled to the input to drive the output to a deasserted state to prevent current from the open stator winding affecting the sensing of the zero crossing.

9. The apparatus of claim 7, wherein the comparator comprises an enable input to receive the tracking signal.

10. The apparatus of claim 7, wherein:
the controller controls an inverter to cause the inverter to provide the PWM signals to the stator windings; and
the tracking signal indicates times at which a body diode of the inverter causes a current to exist in the open stator winding.

11. The apparatus of claim 7, wherein the tracking signal adapts the comparator to sense the back electromotive force during a portion of a PWM off time.

12. The apparatus of claim 7, wherein the tracking signal comprises triggers to cause the comparator to be coupled to the open stator terminal to sense for the back electromotive force, and the controller controls a timing of the triggers based at least in part on whether the back electromotive force is rising or falling.

13. An apparatus comprising:
an integrated circuit comprising a processing core, a comparator and a timer circuit, wherein:
the timer circuit is adapted to provide a plurality of first signals to drive a plurality of stator windings of a brushless direct current (BLDC) motor in a commutation sequence such that in a given phase of the commutation sequence, a given stator winding of the plurality of stator windings is open;
the timer circuit is adapted to provide a tracking signal; and
the comparator is adapted to sense a voltage of the given stator winding during the given phase for a zero crossing of a back electromotive force, wherein a timing of the sensing during the given phase is controlled by the tracking signal.

14. The apparatus of claim 13, wherein the comparator responds to the tracking signal to compare the back electromotive force to a threshold for times indicated by the tracking signal, and the comparator indicates a deasserted state otherwise.

15. The apparatus of claim 14, wherein the comparator is adapted to compare the back electromotive force to the threshold during selected portions of pulse width modulation (PWM) off time of at least one of the first signals.

16. The apparatus of claim 13, wherein the comparator is adapted to compare the back electromotive force to the threshold for times of pulse width modulation (PWM) cycles selected based at least in part on whether the back electromotive force is increasing or decreasing.

17. The apparatus of claim 13, wherein the processing core is adapted to control the timer circuit to regulate a pulse width modulation (PWM) duty cycle, and not intervene in a cycle to cycle generation of the tracking signal.

18. The apparatus of claim 13, wherein the processing core is adapted to regulate the commutation sequence in response to the comparator indicating detection of the zero crossing.

19. The apparatus of claim 13, wherein the processing core is adapted to program the timer circuit with parameters to set up the tracking signal and the first signals.

* * * * *